US008189692B2

(12) United States Patent
Tanimoto et al.

(10) Patent No.: US 8,189,692 B2
(45) Date of Patent: May 29, 2012

(54) SIGNAL TRANSMITTER APPARATUS PROVIDED WITH SIGNAL CORRECTION CIRCUIT FOR SUPPRESSING RADIATION OF ELECTROMAGNETIC WAVES BETWEEN TRANSMISSION LINES

(75) Inventors: Shin-ichi Tanimoto, Kyoto (JP); Seiji Hamada, Osaka (JP); Hirotsugu Fusayasu, Kyoto (JP); Ryo Matsubara, Osaka (JP)

(73) Assignee: Panasonic Corporation, Osaka (JP)

( * ) Notice: Subject to any disclaimer, the term of this patent is extended or adjusted under 35 U.S.C. 154(b) by 681 days.

(21) Appl. No.: 12/441,768

(22) PCT Filed: Sep. 10, 2007

(86) PCT No.: PCT/JP2007/067586
§ 371 (c)(1),
(2), (4) Date: Apr. 21, 2009

(87) PCT Pub. No.: WO2008/035582
PCT Pub. Date: Mar. 27, 2008

(65) Prior Publication Data
US 2010/0111200 A1    May 6, 2010

(30) Foreign Application Priority Data

Sep. 19, 2006   (JP) ................................. 2006-252402

(51) Int. Cl.
*H04B 3/00* (2006.01)
(52) U.S. Cl. ........ 375/257; 375/258; 375/295; 375/316; 375/244; 375/377
(58) Field of Classification Search .................. 375/257, 375/258, 295, 316, 244, 377
See application file for complete search history.

(56) References Cited

U.S. PATENT DOCUMENTS

| 5,146,192 | A | * | 9/1992 | Kondo et al. ................. 333/164 |
| 6,147,533 | A | | 11/2000 | Okuda et al. |
| 6,876,696 | B1 | | 4/2005 | Goodson et al. |
| 7,190,188 | B2 | * | 3/2007 | Otsuka et al. ................... 326/30 |
| 7,388,449 | B2 | * | 6/2008 | Hamada et al. ................. 333/12 |

(Continued)

FOREIGN PATENT DOCUMENTS

JP    10/261948    9/1998

(Continued)

OTHER PUBLICATIONS

International Preliminary Report on Patentability issued Mar. 24, 2009 in PCT/JP2007/067586 (Forms PCT/IB/326, PCT/IB/373, PCT/IB/338 and PCT/IB/237) with English translation.

*Primary Examiner* — Kenneth Lam
(74) *Attorney, Agent, or Firm* — Wenderoth, Lind & Ponack, L.L.P.

(57) ABSTRACT

A voltage memory stores a signal level of a transmission signal from a signal generator at a timing of a clock signal, and outputs the transmission signal. A voltage difference detector detects a signal level of a transmission signal at a timing subsequent to the timing and detects a first signal level difference between the signal level and the signal level from the voltage memory. A maximum value detector, a voltage difference detector and bias voltage sources delay the transmission signal so as to keep a rise time of the transmission signal substantially within a predetermined value range by adding capacitances corresponding to the first signal level differences from the voltage difference detectors to transmission lines.

10 Claims, 4 Drawing Sheets

U.S. PATENT DOCUMENTS

| | | | |
|---|---|---|---|
| 2002/0126581 A1* | 9/2002 | Endo | 368/13 |
| 2003/0001666 A1* | 1/2003 | Watanabe et al. | 327/563 |
| 2003/0039328 A1* | 2/2003 | Tomofuji et al. | 375/354 |
| 2003/0108109 A1* | 6/2003 | Khieu et al. | 375/257 |
| 2005/0080580 A1* | 4/2005 | Kantake | 702/117 |
| 2005/0110737 A1* | 5/2005 | Hosotani | 345/92 |
| 2005/0238107 A1* | 10/2005 | Yamashita et al. | 375/258 |
| 2006/0181303 A1* | 8/2006 | Dreps et al. | 326/29 |

FOREIGN PATENT DOCUMENTS

| | | |
|---|---|---|
| JP | 11-225172 | 8/1999 |
| JP | 11-275159 | 10/1999 |
| JP | 2004-320471 | 11/2004 |
| JP | 2006-191551 | 7/2006 |

* cited by examiner

SIGNAL TRANSMITTER APPARATUS PROVIDED WITH SIGNAL CORRECTION CIRCUIT FOR SUPPRESSING RADIATION OF ELECTROMAGNETIC WAVES BETWEEN TRANSMISSION LINES

TECHNICAL FIELD

The present invention relates to a signal correction circuit for use in a signal transmitter apparatus, a signal correction apparatus having the signal correction circuit, a signal transmitter apparatus employing the signal correction circuit and a signal transmitter apparatus employing the signal correction apparatus.

BACKGROUND ART

In recent years, according to improvements in image quality from VGA (Video Graphics Array) to XGA (eXtended Graphics Array) in flat-panel displays represented by LCD television sets and plasma television sets, signal speed for transferring image information is increasing. Accordingly, as a system for use in high-speed digital data transmissions, a further differential transmission system of low amplitude has been used. The transmission system is provided for transmitting signals having mutually opposite phases and equal amplitudes via two wiring patterns formed on one balanced cable or a printed wiring board. The system has the features of low noise, strong resistance to external noises, low voltage amplitude, high-speed data transmission and so on, and has been introduced as a high-speed transmitting method particularly in the field of displays.

However, in the actual differential transmission for transmitting a transmission signal from a signal transmitter apparatus to a signal receiver apparatus via a differential transmission path constituted to include one pair of transmission lines, a cross point between signals inputted to the signal receiver apparatus has been shifted by variations in the characteristics of the differential driver amplifier that constitutes the signal transmitter apparatus and the loss of symmetry of the differential transmission path, and the transmission signal could not be accurately transmitted.

In a pulse width correction circuit according to the prior art described in the Patent Document 1, the cross point between differential signals is set to an appropriate point by connecting variable capacitance means and a bias power source to each differential transmission path and adjusting the output phase shift of the differential signal transmission line with the capacitance of the variable capacitance means changed by adjusting the voltage of the bias power source.

Patent Document 1: Japanese patent laid-open publication No. JP-11-225172-A

DISCLOSURE OF INVENTION

Problems to be Solved by the Invention

However, the pulse width correction circuit of the prior art has had the following problems. Since the pulse width correction circuit of the prior art has adjusted the cross point between one pair of differential signals near the signal receiver apparatus, radiation of electromagnetic waves from the differential transmission path attributed to the asymmetry and so on of the differential signals could not be suppressed. Moreover, there has been such a problem that the circuit structure is enlarged since it is necessary to provide a management computer for managing the voltage setting data of the bias power source.

An object of the present invention is to solve the above-mentioned problems and provide a signal correction circuit that can suppress radiation of electromagnetic waves generated between a plurality of transmission lines and has a circuit structure simpler than that of the prior art, a signal correction apparatus having the signal correction circuit, a signal transmitter apparatus employing the signal correction circuit and a signal transmitter apparatus employing the signal correction apparatus.

Means for Dissolving the Problems

According to the first aspect of the present invention, there is provided a signal correction circuit for use in a signal transmitter apparatus that transmits a transmission signal generated in accordance with a clock signal having a predetermined cycle via a transmission line. The signal correction circuit includes storage means, first detection means, and delay means. The storage means stores a signal level of the transmission signal at a first timing of the clock signal, and outputs the signal level. The first detecting means detects the signal level of the transmission signal at a second timing subsequent to the first timing of the clock signal, detects a first signal level difference between the detected signal level and the signal level from the storage means, generates a first detection signal representing the detected first signal level difference, and outputs the first detection signal. The delay means delays the transmission signal so as to keep a rise time of the transmission signal substantially within a predetermined value range by adding a capacitance corresponding to the first signal level difference to the transmission line based on the first detection signal.

The above-mentioned signal correction circuit further includes second detection means for detecting a second signal level difference between the first signal level difference and a maximum value of signal level differences between respective adjacent timings of the transmission signal based on the first detection signal, generating a second detection signal representing the detected second signal level difference, and outputting the second detection signal. The delay means delays the transmission signal so as to keep the rise time of the transmission signal within the predetermined value range by adding the capacitance corresponding to the second signal level difference to the transmission line based on the second detection signal.

According to the second aspect of the present invention, there is provided a signal correction apparatus for use in a signal transmitter apparatus that transmits a plurality of transmission signals generated in accordance with a clock signal having a predetermined cycle via a plurality of transmission lines. The signal correction apparatus includes a plurality of signal correction circuits, and maximum value detection means. The signal correction circuits are provided for the plurality of transmission signals, respectively, and each of the signal correction circuits outputs a first detection signal from each of the first detection means. The maximum value detection means detects a maximum value of a plurality of first signal level differences based on the first detection signals from the first detection means of each of the signal correction circuits, and outputs the maximum value as a maximum value of the signal level differences between respective adjacent timings of the transmission signals to the second detection means of each of the signal correction circuits.

According to the third aspect of the present invention, there is provided a signal transmitter apparatus including the above-mentioned signal correction circuit, and signal generating means for generating the transmission signal, and outputting the transmission signal to the signal correction circuit.

In the above-mentioned signal transmitter apparatus, the transmission line is a differential transmission path including one pair of transmission lines, and the signal transmitter apparatus further includes differential driver means for generating one pair of differential signals based on the transmission signal, and outputting the differential signal to the differential transmission path. The delay means adds the capacitance to each of the one pair of transmission lines.

According to the fourth aspect of the present invention, there is provided a signal transmitter apparatus including the above-mentioned signal correction apparatus, and signal generating means for generating the plurality of transmission signals, and outputting the transmission signals to the signal correction apparatus.

In the above-mentioned signal transmitter apparatus, the transmission lines are differential transmission paths that are each including one pair of transmission lines, and the signal transmitter apparatus further includes a plurality of differential driver means for generating one pair of differential signals based on each of the transmission signals, and outputting the differential signals to the respective differential transmission paths. The delay means adds the capacitance to each of the one pair of transmission lines.

In addition, in the above-mentioned signal transmitter apparatus, the storage means stores a signal level of either one of the one pair of differential signals as a signal level of the transmission signal, and the first detection means detects the signal level of either one of the one pair of differential signals as the signal level of the transmission signal. In this case, each of the transmission lines performs transmission by multiplexing a signal on a positive side of the one pair of differential signals with a signal on a negative side of the one pair of differential signals, which are generated based on a further different transmission signal.

Effects of the Invention

According to the signal correction circuit and the signal transmitter apparatus employing the same signal correction circuit of the present invention, there is provided the signal correction circuit for use in a signal transmitter apparatus that transmits a transmission signal generated in accordance with a clock signal having a predetermined cycle via a transmission line. The signal correction circuit includes storage means, first detection means, and delay means. The storage means stores the signal level of the transmission signal at the first timing of the clock signal and outputs the signal level, and the first detecting means detects the signal level of the transmission signal at the second timing subsequent to the first timing of the clock signal, detects a first signal level difference between the detected signal level and the signal level from the storage means, generates a first detection signal representing the detected first signal level difference and outputs the first detection signal; and delay means for delaying the transmission signal so as to keep the rise time of the transmission signal substantially within a predetermined value range by adding capacitance corresponding to the first signal level difference to the transmission line based on the first detection signal. Therefore, the circuit structure can be made simpler than that of the prior art, and the transmission signals can be outputted to be compensated so as to keep each rise time of the transmission signals substantially within the predetermined value range.

Moreover, according to the signal correction circuit and the signal transmitter apparatus employing the same signal correction circuit of the present invention, there is further provided second detection means for detecting a second signal level difference between the first signal level difference and the maximum value of signal level differences between respective adjacent timings of the transmission signal based on the first detection signal, generating a second detection signal representing the detected second signal level difference and outputting the second detection signal, and the delay means delays the transmission signal so as to keep the rise time of the transmission signal within a predetermined value range by adding capacitance corresponding to the second signal level difference to the transmission line based on the second detection signal. Therefore, the circuit structure can be made simpler than that of the prior art, and the transmission signals can be outputted to be compensated so as to keep each rise time of the transmission signals substantially within the predetermined value range.

Furthermore, according to the signal correction apparatus and the signal transmitter apparatus employing the same signal correction circuit of the present invention, there is provided the signal correction apparatus for use in a signal transmitter apparatus that transmits a plurality of transmission signals generated in accordance with a clock signal having a predetermined cycle via a plurality of transmission lines. The signal correction apparatus includes the plurality of signal correction circuits, and maximum value detection means. The plurality of signal correction circuits are provided for the plurality of transmission signals and output a first detection signal from the first detection means. The maximum value detection means detects the maximum value of a plurality of first signal level differences based on the first detection signals from the first detection means of each of the signal correction circuits, and outputs the maximum value as the maximum value of the signal level differences between respective adjacent timings of the transmission signals to the second detection means of each of the signal correction circuits. Therefore, the circuit structure can be made simpler than that of the prior art, and each rise time of the plurality of transmission signals can be kept substantially within a predetermined value range. With this arrangement, noises radiated from each of the transmission lines can be mutually canceled, and therefore, the generation of noises between the transmission lines can be suppressed.

Still further, in the above-mentioned signal transmitter apparatus, the transmission lines are the differential transmission paths that are each constituted by including one pair of transmission lines, and the signal transmitter apparatus further includes differential driver means for generating one pair of differential signals based on the transmission signals and outputting these differential signals to the differential transmission paths, and the delay means adds the capacitance to each of the one pair of transmission lines. Therefore, external noises superimposed in phase on the signals transmitted via the transmission lines can be canceled by the signal receiver apparatus.

Moreover, in the above-mentioned signal transmitter apparatus, the storage means stores the signal level of either one of the one pair of differential signals as the signal level of the transmission signal, and the first detection means detects the signal level of either one of the one pair of differential signals as the signal level of the transmission signal. Therefore, the same structure can be also applied to such a case that the generated differential signals are transmitted via the differential transmission path constituted to include one pair of transmission lines.

Furthermore, in the above-mentioned signal transmitter apparatus, each of the transmission lines performs transmission by multiplexing the signal on the positive side of the one pair of differential signals with the signal on the negative side of the one pair of differential signals generated based on a further different transmission signal. Therefore, the number of the transmission lines can be reduced.

REFERENCE NUMERALS 1, 2, 3 . . . Transmission line,
11, 21, 31 . . . Voltage memory,
12, 13, 22, 23, 32, 33 . . . Voltage difference detector,
14, 15, 24, 25, 34, 35 . . . Bias voltage source,
16, 17, 26, 27, 36, 37 . . . Varactor diode,
18, 28, 38 . . . Differential driver amplifier,
40 . . . Maximum value detector,
51-53, 61-66, 81-86, 87-89 . . . Transmission line,
70, 71, 72 . . . Terminating resistor,
91-93 . . . Differential amplifier,
100, 100A . . . Signal correction circuit,
101-103 . . . Signal generator,
111-113 . . . Buffer,
200, 200A . . . Signal transmitter apparatus,
300 . . . Signal receiver apparatus,
T10, T20, T30 . . . Input terminal,
T11, T12, T21, T22, T31, T32 . . . Output terminal,
T13, T14, T23, T24, T33, T34 . . . Input terminal,
T15, T25, T35 . . . Output terminal.

BEST MODE FOR CARRYING OUT THE INVENTION

Preferred embodiments of the present invention will be described with reference to the drawings. In each of the following preferred embodiments, like components are denoted by like reference numerals.

First Preferred Embodiment

Figure 1:
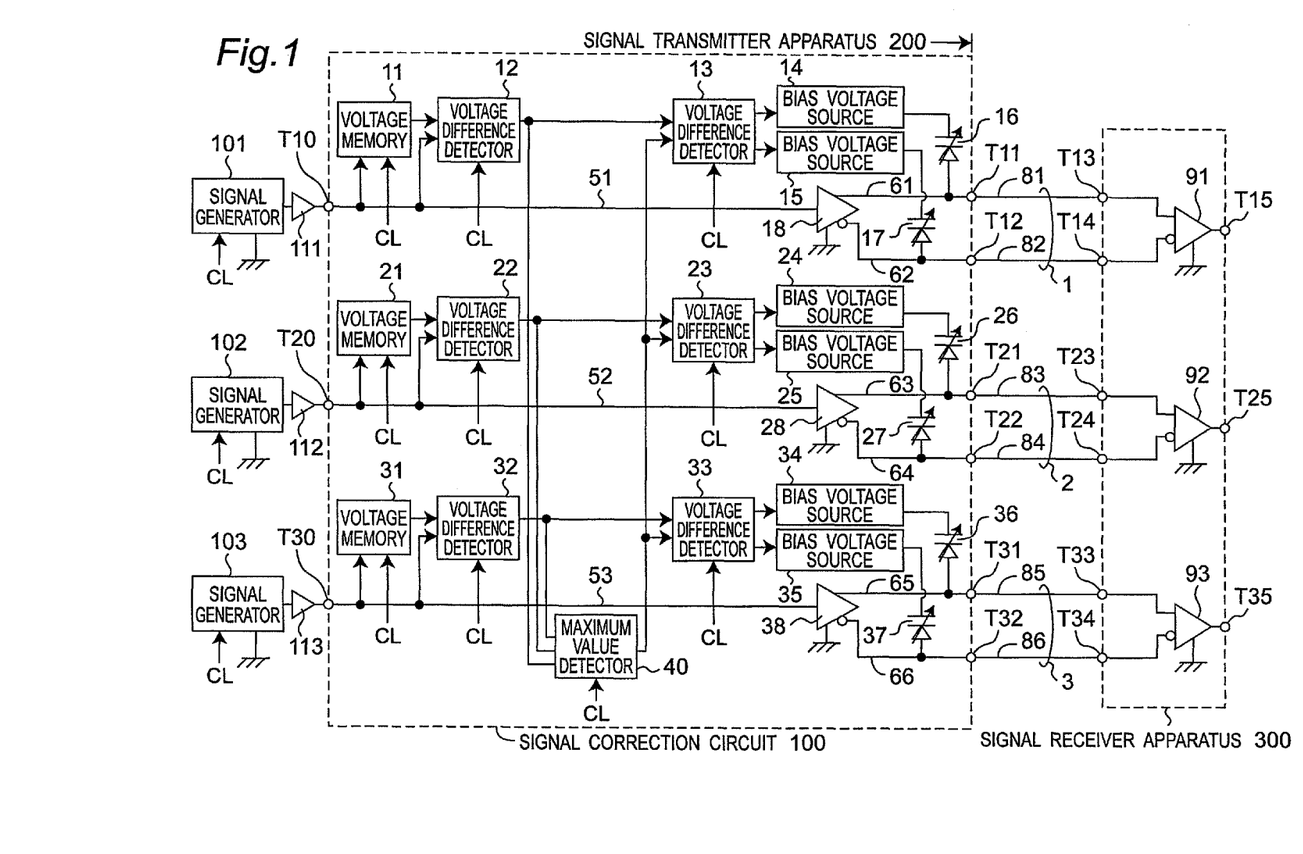
FIG. 1 is a block diagram showing schematic structures of a signal transmitter apparatus 200 and a signal receiver apparatus 300 according to a first preferred embodiment of the present invention.

FIG. 1 is a block diagram showing schematic structures of a signal transmitter apparatus 200 and a signal receiver apparatus 300 according to the first preferred embodiment of the present invention.

Referring to FIG. 1, the signal transmitter apparatus 200 is constituted to include signal generators 101 to 103, buffers 111 to 113, and a signal correction circuit 100.

The signal generator 101 generates a transmission signal S1 having voltage levels of −1 V, 0 V or 1 V at the timings of rising edges of a clock signal CL having a form of pulses cyclically repeated at predetermined cycles, and outputs the transmission signal S1 to a signal correction circuit 100 via the buffer 111 and an input terminal T10. Moreover, the signal generator 102 generates a transmission signal S2 in a manner similar to that of the signal generator 101, and outputs the transmission signal S2 to the signal correction circuit 100 via the buffer 112 and an input terminal T20. Further, the signal generator 103 generates a transmission signal S3 in a manner similar to that of the signal generator 101, and outputs the transmission signal S3 to the signal correction circuit 100 via the buffer 113 and an input terminal T30.

The signal correction circuit 100 is provided for correcting the rise time or the fall time described in detail later for each of differential signals generated based on the inputted transmission signals S1 to S3, and for differentially outputting the signals to a transmission line 1 that is a balanced differential transmission path constituted by including transmission lines 81 and 82, a transmission line 2 that is a balanced differential transmission path constituted by including transmission lines 83 and 84, and a transmission line 3 that is a balanced differential transmission path constituted by including transmission lines 85 and 86. The signal correction circuit 100 is constituted to include the input terminals T10, T20 and T30, voltage memories 11, 21 and 31, voltage difference detectors 12, 13, 22, 23, 32 and 33, bias voltage sources 14, 15, 24, 25, 34 and 35, varactor diodes 16, 17, 26, 27, 36 and 37, differential driver amplifiers 18, 28 and 38, output terminals T11, T12, T21, T22, T31 and T32, a maximum value detector 40, and transmission lines 51 to 53 and 61 to 66. In this case, the voltage memories 11, 21 and 31, the voltage difference detectors 12, 13, 22, 23, 32 and 33, and the maximum value detector 40 operate in synchronization with the clock signal CL.

In this case, the signal transmitter apparatus 200 of the present preferred embodiment is characterized by including the signal correction circuit 100 and the signal generators 101 to 103 that generate the transmission signals S1 to S3 in synchronization with the clock signal CL having a predetermined cycle, and outputs the transmission signals S1 to S3 to the signal correction circuit 100. Moreover, the signal correction circuit 100 is characterized by including: the voltage memories 11, 21 and 31 that store the voltage levels of the transmission signals S1 to S3 at a first timing of the clock signal CL and output the voltage levels; voltage difference detectors 12, 22 and 32 that detect the voltage levels of the transmission signals S1 to S3 at a second timing subsequent to the first timing of the clock signal CL, detect first voltage level differences between the detected voltage levels and the voltage levels from the voltage memories 11, 21 and 31, generate first voltage level difference signals that represent the detected first voltage level differences and output the first voltage level difference signals; the maximum value detector 40 that detects the maximum value of the three first voltage level differences based on the first voltage level difference signals from the voltage difference detectors 12, 22 and 32; the voltage difference detectors 13, 23 and 33 that detect second voltage level differences between the first voltage level differences and the maximum value from the maximum value detector 40 based on the first voltage level difference signals, generate second voltage level difference signals representing the second voltage level differences and output the second voltage level difference signals; the bias voltage source 14 that delays a non-inverted signal of the transmission signal S1 so as to keep the rise time (or fall time) of the non-inverted signal of the transmission signal S1 substantially within a predetermined value range by adding capacitance corresponding to the second voltage level difference to the transmission line 61 based on the second voltage level difference signal from the voltage difference detector 13; a bias voltage source 15 that delays an inverted signal of the transmission signal S1 so as to keep the fall time (or rise time) of the inverted signal of the transmission signal S1 substantially within a predetermined value range by adding capacitance corresponding to the second voltage level difference to the transmission line 62 based on the second voltage level difference signal from the voltage difference detector 13; and bias voltage sources 24, 25, 34 and 35 that operate in a manner similar to that of the bias voltage sources 14 and 15.

Referring to FIG. 1, the transmission signal S1 generated by the signal generator 101 is outputted to the differential driver amplifier 18 via the buffer 111, the input terminal T10 and the transmission line 51. Subsequently, the differential driver amplifier 18 generates one pair of differential signals constituted to include a non-inverted signal and an inverted signal having a predetermined amplitude according to the amplitude of the inputted transmission signal S1, and outputs the non-inverted signal and the inverted signal to the transmission lines 61 and 62, respectively. After being subjected to correction of each rise time (or fall time) on the transmission line 61 as described in detail later, the non-inverted signal from the differential driver amplifier 18 outputted to the transmission line 81 via the output terminal T11. The inverted signal from the differential driver amplifier 18 is outputted to the transmission line 62 and, after being subjected to correction of each rise time (or fall time) on the transmission line 62 as described in detail later, the signal is outputted to the transmission line 82 via the output terminal T12. The differential driver amplifier 28 generates a non-inverted signal and an inverted signal based on the transmission signal S2 in a manner similar to that of the differential driver amplifier 18, and outputs these signals to the transmission lines 63 and 64, respectively. Further, the differential driver amplifier 38 generates a non-inverted signal and an inverted signal based on the transmission signal S3 in a manner similar to that of the differential driver amplifier 18, and outputs these signals to the transmission lines 65 and 66, respectively.

The voltage memory 11 detects and stores the voltage level of the transmission signal S1 at the timing of each falling edge of the clock signal CL, generates a signal representing the stored voltage level at the timing of the subsequent rising edge of the clock signal CL, and outputs the signal to the voltage difference detector 12. The voltage difference detector 12 detects the voltage level of the transmission signal S1 at the timing of the subsequent falling edge of the clock signal CL, detects the level difference (hereinafter referred to as a first voltage level difference) between the detected present voltage level and the voltage level at the immediately previous timing of the clock signal CL from the voltage memory 11, generates a first voltage level difference signal representing the first voltage level difference of the detected transmission signal S1, and outputs the first voltage level difference signal to the maximum value detector 40 and the voltage difference detector 13.

Moreover, the voltage memory 21 and the voltage difference detector 22 operate in a manner similar to that of the voltage memory 11 and the voltage difference detector 12, respectively, and the voltage difference detector 22 generates the first voltage level difference signal representing the first voltage level difference of the transmission signal S2, and outputs the first voltage level difference signal to the maximum value detector 40 and the voltage difference detector 23. Further, the voltage memory 31 and the voltage difference detector 32 operate in a manner similar to that of the voltage memory 11 and the voltage difference detector 12, respectively, and the voltage difference detector 32 generates the first voltage level difference signal representing the first voltage level difference of the transmission signal S3, and outputs the first voltage level difference signal to the maximum value detector 40 and the voltage difference detector 33.

The maximum value detector 40 detects the maximum value (hereinafter referred to as a maximum voltage level difference) of the first voltage level difference of each of the transmission signals S1 to S3 based on the first voltage level difference signals from the voltage difference detectors 12, 22 and 32, and outputs the maximum voltage level difference signal representing the detected maximum voltage level difference to the voltage difference detectors 13, 23 and 33.

The voltage difference detector 13 detects a level difference (hereinafter referred to as a second voltage level difference) between the first voltage level difference of the transmission signal S1 and the maximum voltage level difference at the timing of each falling edge of the clock signal CL based on the first voltage level difference signal from the voltage difference detector 12 and the maximum voltage level difference signal from the maximum value detector 40, and outputs a signal representing the detected second voltage level difference to the bias voltage sources 14 and 15. In response to this, the bias voltage source 14 generates a reverse bias voltage of a smaller absolute value as the second voltage level difference of the transmission signal S1 is larger and applies the voltage to the varactor diode 16, and this leads to application of a larger capacitance to the transmission line 61 and increasing the delay time, i.e., the rise time (or fall time) of the non-inverted signal from the differential driver amplifier 18. By this operation, the rise time (or fall time) of the non-inverted signal from the differential driver amplifier 18 is kept substantially within a predetermined value range. Moreover, in response to the signal from the voltage difference detector 13, the bias voltage source 15 generates a reverse bias voltage substantially equal to the reverse bias voltage generated by the bias voltage source 14 and applies the voltage to the varactor diode 17. By this operation, the delay time, i.e., the fall time (or rise time) of the inverted signal from the differential driver amplifier 18 is kept substantially within a predetermined value range. In this case, the rise time (or fall time) of the non-inverted signal from the differential driver amplifier 18 is the charging time (or discharging time) of the varactor diode 16 determined depending on the product of the capacitance of the varactor diode 16 and a resistance value at the output terminal T11. The rise time (or fall time) of the inverted signal from the differential driver amplifier 18 is the charging time (or discharging time) of the varactor diode 17 determined depending on the product of the capacitance of the varactor diode 17 and a resistance value at the output terminal T12.

The non-inverted signal outputted from the differential driver amplifier 18 to the transmission line 61 is subjected to adjustment of the rise time (or fall time) as described above, and then, is outputted to the transmission line 81 via the output terminal T11. The inverted signal outputted from the differential driver amplifier 18 to the transmission line 62 is subjected to adjustment of the fall time (or rise time) as described above, and then, is outputted to the transmission line 82 via the output terminal T12. It is noted that the adjustment of the rise time (or fall time) of the non-inverted signal and the inverted signal generated based on the transmission signal S1 is performed within a time interval of one cycle of the clock signal CL.

Moreover, the voltage difference detector 23, the bias voltage sources 24 and 25, the varactor diodes 26 and 27 and the differential driver amplifier 28 operate in a manner similar to that of the voltage difference detector 13, the bias voltage sources 14 and 15, the varactor diodes 16 and 17 and the differential driver amplifier 18, respectively. Further, the voltage difference detector 33, the bias voltage sources 34 and 35, the varactor diodes 36 and 37 and the differential driver amplifier 38 operate in a mariner similar to that of the voltage difference detector 13, the bias voltage sources 14 and 15, the varactor diodes 16 and 17 and the differential driver amplifier 18.

Referring to FIG. 1, the signal receiver apparatus 300 is constituted to include input terminals T13, T14, T23, T24, T33 and T34, differential amplifiers 91 to 93, and output terminals T15, T25 and T35. The differential amplifier 91 receives the non-inverted signal generated by the differential driver amplifier 18 via the transmission line 61, the output terminal T11, the transmission line 81, the input terminal T13 and the non-inverted input terminal of the differential amplifier 91, receives the inverted signal generated by the differential driver amplifier 18 via the transmission line 62, the output terminal T12, the transmission line 82, the input terminal T14 and the inverted input terminal of the differential amplifier 91, restores the transmission signal S1 from the received two signals, and outputs the transmission signal S1 to the output terminal T15. Moreover, the differential amplifier 92 restores the transmission signal S2 from the received two signals in a manner similar to that of the differential amplifier 91, and outputs the transmission signal S2 to the output terminal T25. Further, the differential amplifier 93 restores the transmission signal S3 from the received two signals in a manner similar to that of the differential amplifier 91, and outputs the transmission signal S3 to the output terminal T35.

The operation of the signal correction circuit 100 constituted as above will be described next. The voltage memory 11 detects and stores the voltage level of the transmission signal S1 at the timing t1 of the falling edge of the clock signal CL, generates a signal representing the stored voltage level, and outputs the signal to the voltage difference detector 12 at the timing t2 of the rising edge subsequent to the timing t1 of the clock signal CL. The voltage difference detector 12 detects the voltage level of the transmission signal S1 at the timing t3 of the falling edge subsequent to the timing t2 of the clock signal CL, detects the first voltage level difference that is the level difference between the voltage level at the detection timing t3 and the voltage level at the timing t1 from the voltage memory 11, generates the first voltage level difference signal representing the first voltage level difference of the detected transmission signal S1, and outputs the first voltage level difference signal to the maximum value detector 40 and the voltage difference detector 13.

Moreover, the voltage memory 21 detects and stores the voltage level of the transmission signal S2 at the timing t1, generates a signal representing the stored voltage level, and outputs the signal to the voltage difference detector 22 at the timing t2. At the timing t3, the voltage difference detector 22 detects the voltage level of the transmission signal S2, detects the first voltage level difference that is the level difference between the detected voltage level at the timing t3 and the voltage level from the voltage memory 21 at the timing t1, generates the first voltage level difference signal representing the first voltage level difference of the detected transmission signal S2, and outputs the first voltage level difference signal to the maximum value detector 40 and the voltage difference detector 23.

Further, the voltage memory 31 detects and stores the voltage level of the transmission signal S3 at the timing t1, generates a signal representing the stored voltage level, and outputs the signal to the voltage difference detector 32 at the timing t2. The voltage difference detector 32 detects the voltage level of the transmission signal S3 at the timing t3, detects the first voltage level difference that is the level difference between the detected voltage level at the timing t3 and the voltage level from the voltage memory 31 at the timing t1, generates the first voltage level difference signal representing the first voltage level difference of the detected transmission signal S3, and outputs the first voltage level difference signal to the maximum value detector 40 and the voltage difference detector 33.

Next, the maximum value detector 40 detects the maximum voltage level difference that is the maximum value of the first voltage level differences of the transmission signals S1 to S3 based on the first voltage level difference signals from the voltage difference detectors 21, 22 and 32, and outputs the maximum voltage level difference signal representing the detected maximum voltage level difference to the voltage difference detectors 13, 23 and 33.

Next, the voltage difference detector 13 detects the second voltage level difference based on the first voltage level difference signal from the voltage difference detector 12 and the maximum voltage level difference signal from the maximum value detector 40, and outputs a signal representing the detected second voltage level difference to the bias voltage sources 14 and 15. In response to this, the bias voltage source 14 delays the non-inverted signal so as to keep the rise time (or fall time) of the non-inverted signal from the differential driver amplifier 18 substantially within a predetermined value range by adding capacitance corresponding to the second voltage level difference to the transmission line 61 as described above. Moreover, the bias voltage source 15 delays the inverted signal so as to keep the fall time (or rise time) of the inverted signal from the differential driver amplifier 18 substantially within a predetermined value range by adding capacitance corresponding to the second voltage level difference to the transmission line 62 as described above.

Moreover, the voltage difference detector 23 detects the second voltage level difference based on the first voltage level difference signal from the voltage difference detector 22 and the maximum voltage level difference signal from the maximum value detector 40, and outputs a signal representing the detected second voltage level difference to the bias voltage sources 24 and 25. In response to this, the bias voltage source 24 delays the non-inverted signal so as to keep the rise time (or fall time) of the non-inverted signal from the differential driver amplifier 28 substantially within a predetermined value range by adding capacitance corresponding to the second voltage level difference to the transmission line 63 as described above. Moreover, the bias voltage source 25 delays the inverted signal so as to keep the fall time (or rise time) of the inverted signal from the differential driver amplifier 28 substantially within a predetermined value range by adding capacitance corresponding to the second voltage level difference to the transmission line 64 as described above.

Further, the voltage difference detector 33 detects the second voltage level difference based on the first voltage level difference signal from the voltage difference detector 32 and the maximum voltage level difference signal from the maximum value detector 40, and outputs a signal representing the detected second voltage level difference to the bias voltage sources 34 and 35. In response to this, the bias voltage source 34 delays the non-inverted signal so as to keep the rise time (or fall time) of the non-inverted signal from the differential driver amplifier 38 substantially within a predetermined value range by adding capacitance corresponding to the second voltage level difference to the transmission line 65 as described above. Moreover, the bias voltage source 35 delays the inverted signal so as to keep the fall time (or rise time) of the inverted signal from the differential driver amplifier 38 substantially within a predetermined value range by adding capacitance corresponding to the second voltage level difference to the transmission line 66 as described above.

According to the signal correction circuit 100 constituted as above and the signal transmitter apparatus 200 having the same signal correction circuit 100, the rise times and the fall times at the timing t2 of all the differential signals generated based on the transmission signals S1 to S3 are corrected so as to be kept substantially within the predetermined value ranges and are thereafter able to be outputted to the transmission lines 1 to 3. Therefore, noises radiated from the transmission lines cancel each other, and no radiation of electromagnetic waves is generated at the transmission lines 1 to 3. Moreover, there is needed no management computer for managing the reverse bias voltage applied to the varactor diodes 16, 17, 26, 27, 36 and 37, and therefore, the circuit structure is simpler than that of the prior art. Furthermore, the signal transmitter apparatus 200 outputs the transmission signals S1 to S3 to the differential amplifiers 91 to 93 in a differential manner via the transmission lines 1 to 3, and therefore, external noises superimposed in phase on the signals transmitted via the transmission lines 81 to 86 that constitute the transmission lines 1 to 3 can be canceled by the differential amplifiers 91 to 93.

Although the predetermined capacitance is added to each of the transmission lines 61 to 66 by changing the reverse bias voltage applied to each of the varactor diodes 16, 17, 26, 27, 36 and 37 in the above-mentioned preferred embodiment, the present invention is not limited to this. It is acceptable to provide, for example, a plurality of capacitive elements that have mutually different capacitances for adding capacitance to each of the transmission lines by selective switching in accordance with the second voltage level difference signal in place of the combinations of the bias voltage sources and the varactor diodes.

Moreover, although the transmission signals S1 to S3 are the signals having three different voltage levels in the above-mentioned preferred embodiment, the present invention is not limited to this, and they may be signals having four or more different voltage levels. Furthermore, although the changing widths of the voltage levels of the transmission signals S1 to S3 are mutually equal in the above-mentioned preferred embodiment, the present invention is not limited to this, and the changing widths of the voltage levels of the transmission signals S1 to S3 may be mutually different from each other.

Furthermore, although the rise times (or fall times) of the non-inverted signal and the inverted signal from the differential drivers amplifiers 18, 28 and 38 are corrected in the above-mentioned preferred embodiment, the present invention is not limited to this, and it is acceptable to correct the rise times (or fall times) of the transmission signals S1 to S3. Although the signal transmitter apparatus 200 transmits the transmission signals S1 to S3 to the transmission lines 1 to 3 in a differential manner in the above-mentioned preferred embodiment, the present invention is not limited to this, and the signals may be outputted in a single-ended manner.

Furthermore, although each of the voltage difference detectors 13, 23 and 33 detects the level difference between the first voltage level difference concerning the transmission signals S1 to S3 and the maximum voltage level difference that is the maximum value of them in the above-mentioned preferred embodiment, the present invention is not limited to this, and the following structure may be provided. That is, the voltage difference detectors 13, 23 and 33 may each detect a level difference between the first voltage level difference concerning the transmission signals S1 to S3 and a predetermined voltage level difference of the theoretical value of the maximum value of the signal level difference between respective adjacent timings of all the transmission signals S1 to S3. With this arrangement, it is not necessary to provide the maximum value detector 40, and the rise time (or fall time) of each output signal from the signal correction circuit 100 can be kept substantially within a predetermined value range.

Further, the following structure may be provided instead of providing the voltage difference detectors 13, 23 and 33 and the maximum value detector 40 in the signal correction circuit 100. That is, by generating reverse bias voltages of the smaller absolute values as the first voltage level difference is smaller based on the first voltage level difference signal from the voltage difference detector 12 in the bias voltage sources 14 and 15 and applying the voltages to the varactor diodes 16 and 17, larger capacitances are given to the signal transmission lines 61 and 62, and this leads to a larger delay applied to the signals transmitted on the transmission lines 61 and 62. By this operation, the rise time (or fall time) of the signal transmitted on each of the transmission lines 61 and 62 can be kept substantially within the predetermined value range. Furthermore, by generating reverse bias voltages in a manner similar to that of the bias voltage sources 14 and 15 based on the first voltage level difference signal from the voltage difference detector 22 in the bias voltage sources 24 and 25, applying the voltages to the varactor diodes 26 and 27, generating reverse bias voltages in a manner similar to that of the bias voltage sources 14 and 15 based on the first voltage level difference signal from the voltage difference detector 32 in the bias voltage sources 34 and 35 and applying the voltages to the varactor diodes 36 and 37, the rise times (or fall times) of the signals transmitted on all the transmission lines 81 to 86 can be kept substantially within the predetermined value range.

Moreover, although the signal transmitter apparatus 200 generates the three transmission signals S1 to S3 and transmits the signals to the signal receiver apparatus 300 in the above-mentioned preferred embodiment, the present invention is not limited to this, and it is acceptable to generate at least one transmission signal and transmit the signal to the signal receiver apparatus 300. When the transmitter apparatus 200 generates only one transmission signal S1 and transmits the signal to the signal receiver apparatus 300, it is acceptable that the signal correction circuit 100 is constituted to include the voltage memory 11, the voltage difference detector 12, the voltage difference detector 13, the bias voltage sources 14 and 15, the varactor diodes 16 and 17, the differential driver amplifier 18 and the transmission lines 51, 61 and 62 of FIG. 1, and the voltage difference detector 13 detects the level difference between the first voltage level difference concerning the transmission signal S1 and the theoretical value of the maximum value of the signal level differences between respective adjacent timings of the transmission signal S1, generates a signal representing the detected level difference, and outputs the signal to the bias voltage sources 14 and 15. Otherwise, it is acceptable to delay the transmission signal S1 so that the rise time (or fall time) of the transmission signal S1 is kept substantially within a predetermined value range by constituting the signal correction circuit 100 of the voltage memory 11, the voltage difference detector 12, the bias voltage sources 14 and 15, the varactor diodes 16 and 17, the differential driver amplifier 18, the transmission lines 51, 61 and 62 and making the bias voltage sources 14 and 15 add capacitance corresponding to the first signal level difference to the transmission lines 61 and 62 based on the first voltage level difference signal from the voltage difference detector 12. With this arrangement, each rise time (or fall time) of the transmission signal S1 can be corrected so as to be kept substantially within a predetermined value range.

Furthermore, although the voltage memories 11, 21 and 31 and the voltage difference detectors 12, 22 and 32 detect the voltage levels of the transmission signals S1 to S3 in the above-mentioned preferred embodiment, the present invention is not limited to this, and the signal levels of the transmission signals S1 to S3 may be detected.

Modified Preferred Embodiment of First Preferred Embodiment

Figure 2:
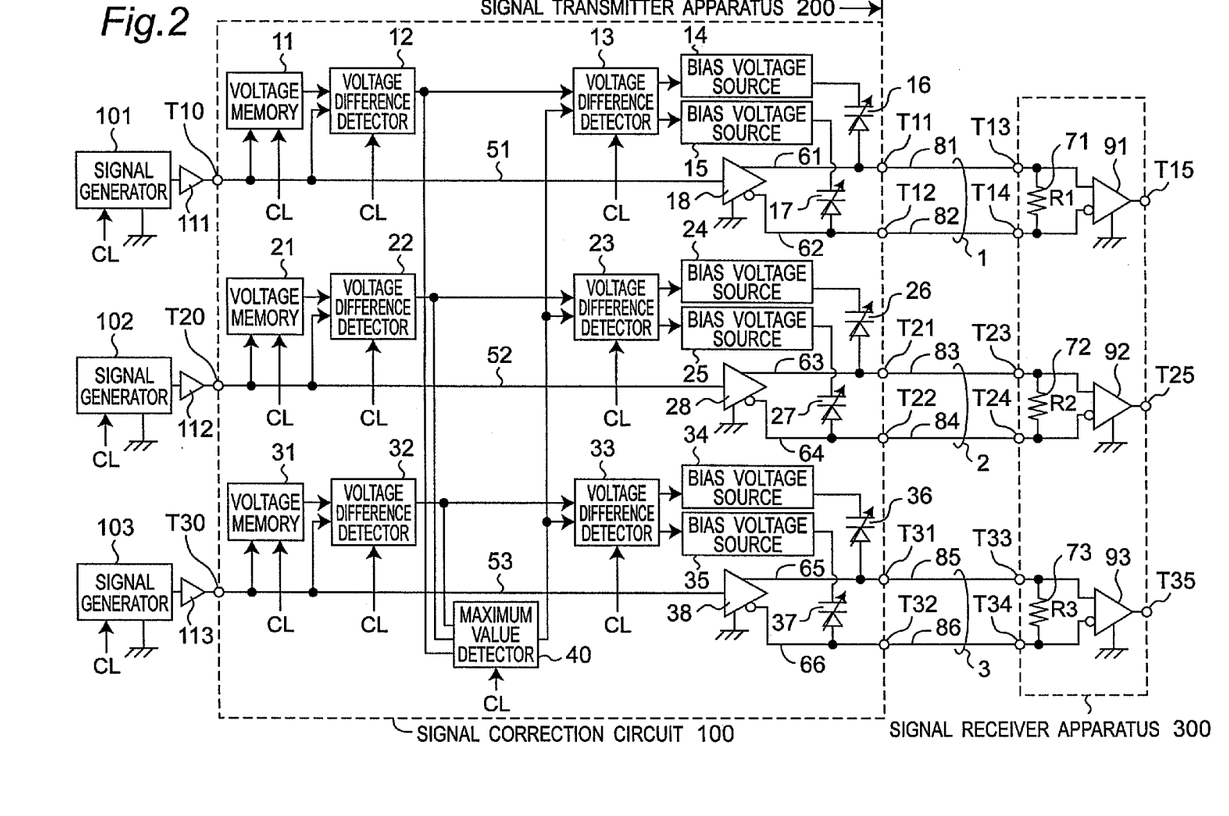
FIG. 2 is a block diagram showing schematic structures of a signal transmitter apparatus 200 and a signal receiver apparatus 300 according to a modified preferred embodiment of the first preferred embodiment of the present invention.

FIG. 2 is a block diagram showing schematic structures of a signal transmitter apparatus 200 and a signal receiver apparatus 300 according to a modified preferred embodiment of the first preferred embodiment of the present invention. As shown in FIG. 2, it is acceptable that the signal receiver apparatus 300 further includes terminating resistors 71, 72 and 73 that are connected to both terminals of differential amplifiers 91, 92 and 93 and have resistance values R1, R2 and R3, respectively, and detects the polarities of termination voltages generated at the terminating resistors 71, 72 and 73.

Second Preferred Embodiment

Figure 3:
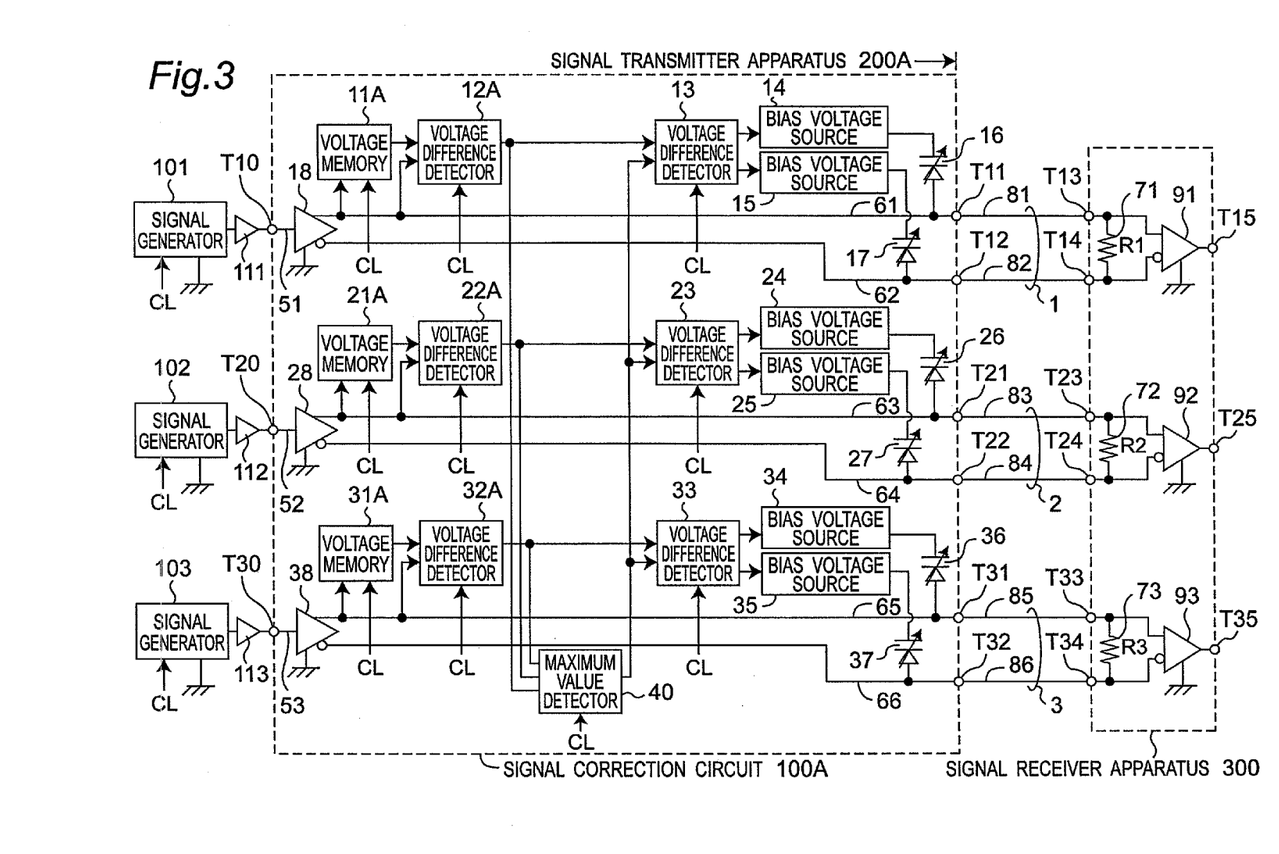
FIG. 3 is a block diagram showing schematic structures of a signal transmitter apparatus 200A and a signal receiver apparatus 300 according to a second preferred embodiment of the present invention.

FIG. 3 is a block diagram showing schematic structures of a signal transmitter apparatus 200A and a signal receiver apparatus 300 according to the second preferred embodiment of the present invention. Referring to FIG. 3, the signal transmitter apparatus 200A differs from the signal transmitter apparatus 200 of the modified preferred embodiment of the first preferred embodiment shown in FIG. 2, in that voltage memories 11A, 21A and 31A are provided in place of the voltage memories 11, 21 and 31 and voltage difference detectors 12A, 22A and 32A are provided in place of the voltage difference detectors 12, 22 and 32. The other points are similar to those of the modified preferred embodiment of the first preferred embodiment, and no repeated description is provided for the components denoted by same reference numerals.

The differential driver amplifier 18 outputs a transmission signal S11 having a voltage level of −1 V from the non-inverted output terminal to the transmission line 61, and outputs a transmission signal S12 having a voltage level of 1 V from the inverted output terminal to the transmission line 62 when the signal S1 inputted to the input terminal T10 has a bit "0". When the signal S1 has a bit "1", a transmission signal S11 having a voltage level of 1 V is outputted from the non-inverted output terminal to the transmission line 61, and a transmission signal S12 having a voltage level of −1 V is outputted from the inverted output terminal to the transmission line 62. Moreover, the differential driver amplifier 28 outputs transmission signals S21 and S22 to the transmission line 63 and the transmission line 64, respectively, in accordance with the bit value of the signal S2 inputted to the input terminal T20 in a manner similar to that of the differential driver amplifier 18. Moreover, the differential driver amplifier 38 also outputs transmission signals S31 and S32 to the transmission line 65 and the transmission line 66, respectively, in accordance with the bit value of the signal S3 inputted to the input terminal T30 in a manner similar to that of the differential driver amplifier 18.

The voltage memories 11A, 21A and 31A detect and store the voltage levels of the transmission signals S11, S21 and S31, respectively, at the timing of each falling edge of the clock signal CL, generate signals that represent the stored voltage levels at the timing of the subsequent rising edge of the clock signal CL and output these signals to the voltage difference detectors 12A, 22A and 32A, respectively. The voltage difference detectors 12A, 22A and 32A detect the voltage levels of the transmission signals S11, S21 and S31 at the timing of the subsequent falling edge of the clock signal CL, detect a level difference (hereinafter referred to as the first voltage level difference) between the detected present voltage level and the voltage level at the immediately previous timing of the clock signal CL, generate first voltage level difference signals that represent the first voltage level differences of the detected transmission signals S11, S21 and S31, and output the first voltage level difference signals.

According to the signal correction circuit 100A constituted as above and the signal transmitter apparatus 200A having the same signal correction circuit 100A, an effect similar to that of the signal transmitter apparatus 200 of the first preferred embodiment is produced, and this structure can be also applied to such a case that one pair of differential signals are generated by each of the differential amplifiers 18, 28 and 38 based on the signals S1, S2 and S3 inputted from the input terminals T10, T20 and T30, respectively, and the generated differential signals are transmitted via a differential transmission path constituted to include one pair of transmission lines.

Modified Preferred Embodiment of Second Preferred Embodiment

Figure 4:
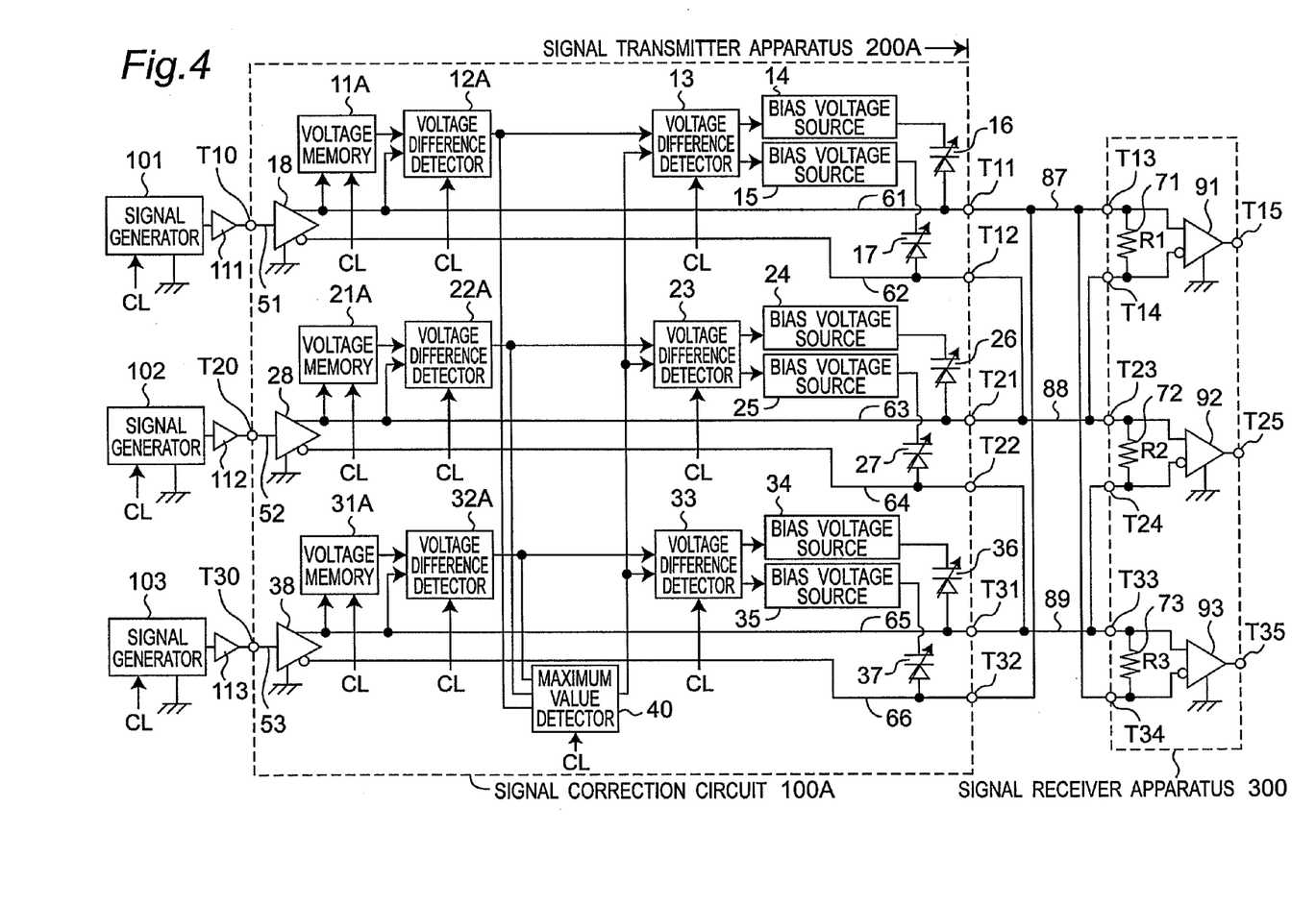
FIG. 4 is a block diagram showing schematic structures of a signal transmitter apparatus 200A and a signal receiver apparatus 300 according to a modified preferred embodiment of the second preferred embodiment of the present invention.

FIG. 4 is a block diagram showing schematic structures of a signal transmitter apparatus 200A and a signal receiver apparatus 300 according to a modified preferred embodiment of the second preferred embodiment of the present invention. As shown in FIG. 4, a signal transmission line may be constituted between the signal correction circuit 100A and the signal receiver circuit 300.

Referring to FIG. 4, the output signal S11 at the output terminal T11 and the output signal S32 at the output terminal T32 are multiplexed together and transmitted via a transmission line 87. The output signal S21 at the output terminal T21 and the output signal S12 at the output terminal T12 are multiplexed together and transmitted via a transmission line 88. The output signal S31 at the output terminal T31 and the output signal S22 at the output terminal T22 are multiplexed together and transmitted via a transmission line 89.

The differential amplifier 91 receives the non-inverted signal generated by the differential driver amplifier 18 via the transmission line 61, the output terminal T11, the transmission line 87, the input terminal T13 and the non-inverted input terminal of the differential amplifier 91, receives the inverted signal generated by the differential driver amplifier 18 via the transmission line 62, the output terminal T12, the transmission line 88, the input terminal T14 and the inverted input terminal of the differential amplifier 91, restores the transmission signal S1 from the received two signals, and outputs the transmission signal S1 to the output terminal T15. The differential amplifier 92 restores the transmission signal S2 from the two signals received via the transmission lines 88 and 89 in a manner similar to that of the differential amplifier 91, and outputs the transmission signal S2 to the output terminal T25. The differential amplifier 93 restores the transmission signal S3 from the two signals received via the transmission lines 89 and 87 in a manner similar to that of the differential amplifier 91, and outputs the transmission signal S3 to the output terminal T35.

With the above-mentioned arrangement, an effect similar to that of the second preferred embodiment is produced, and the number of the transmission lines can be reduced by half in comparison with that of the second preferred embodiment.

APPLICABILITY OF INDUSTRIAL UTILIZATION

As described above in detail, according to the signal correction circuit and the signal transmitter apparatus employing the same signal correction circuit of the present invention, there is provided the signal correction circuit for use in a signal transmitter apparatus that transmits a transmission signal generated in accordance with a clock signal having a predetermined cycle via a transmission line. The signal correction circuit includes storage means, first detection means, and delay means. The storage means stores the signal level of the transmission signal at the first timing of the clock signal and outputs the signal level, and the first detecting means detects the signal level of the transmission signal at the second timing subsequent to the first timing of the clock signal, detects a first signal level difference between the detected signal level and the signal level from the storage means, generates a first detection signal representing the detected first signal level difference and outputs the first detection signal; and delay means for delaying the transmission signal so as to keep the rise time of the transmission signal substantially within a predetermined value range by adding capacitance corresponding to the first signal level difference to the transmission line based on the first detection signal. Therefore, the circuit structure can be made simpler than that of the prior art, and the transmission signals can be outputted to be compensated so as to keep each rise time of the transmission signals substantially within the predetermined value range.

Moreover, according to the signal correction circuit and the signal transmitter apparatus employing the same signal correction circuit of the present invention, there is further provided second detection means for detecting a second signal level difference between the first signal level difference and the maximum value of signal level differences between respective adjacent timings of the transmission signal based on the first detection signal, generating a second detection signal representing the detected second signal level difference and outputting the second detection signal, and the delay means delays the transmission signal so as to keep the rise time of the transmission signal within a predetermined value range by adding capacitance corresponding to the second signal level difference to the transmission line based on the second detection signal. Therefore, the circuit structure can be made simpler than that of the prior art, and the transmission signals can be outputted to be compensated so as to keep each rise time of the transmission signals substantially within the predetermined value range.

Furthermore, according to the signal correction apparatus and the signal transmitter apparatus employing the same signal correction circuit of the present invention, there is provided the signal correction apparatus for use in a signal transmitter apparatus that transmits a plurality of transmission signals generated in accordance with a clock signal having a predetermined cycle via a plurality of transmission lines. The signal correction apparatus includes the plurality of signal correction circuits, and maximum value detection means. The plurality of signal correction circuits are provided for the plurality of transmission signals and output a first detection signal from the first detection means. The maximum value detection means detects the maximum value of a plurality of first signal level differences based on the first detection signals from the first detection means of each of the signal correction circuits, and outputs the maximum value as the maximum value of the signal level differences between respective adjacent timings of the transmission signals to the second detection means of each of the signal correction circuits. Therefore, the circuit structure can be made simpler than that of the prior art, and each rise time of the plurality of transmission signals can be kept substantially within a predetermined value range. With this arrangement, noises radiated from each of the transmission lines can be mutually canceled, and therefore, the generation of noises between the transmission lines can be suppressed.

Still further, in the above-mentioned signal transmitter apparatus, the transmission lines are the differential transmission paths that are each constituted by including one pair of transmission lines, and the signal transmitter apparatus further includes differential driver means for generating one pair of differential signals based on the transmission signals and outputting these differential signals to the differential transmission paths, and the delay means adds the capacitance to each of the one pair of transmission lines. Therefore, external noises superimposed in phase on the signals transmitted via the transmission lines can be canceled by the signal receiver apparatus.

Moreover, in the above-mentioned signal transmitter apparatus, the storage means stores the signal level of either one of the one pair of differential signals as the signal level of the transmission signal, and the first detection means detects the signal level of either one of the one pair of differential signals as the signal level of the transmission signal. Therefore, the same structure can be also applied to such a case that the generated differential signals are transmitted via the differential transmission path constituted to include one pair of transmission lines.

Furthermore, in the above-mentioned signal transmitter apparatus, each of the transmission lines performs transmission by multiplexing the signal on the positive side of the one pair of differential signals with the signal on the negative side of the one pair of differential signals generated based on a further different transmission signal. Therefore, the number of the transmission lines can be reduced.

The invention claimed is:

1. A signal correction circuit for use in a signal transmitter apparatus that transmits a transmission signal generated in accordance with a clock signal having a predetermined cycle via a transmission line, the signal correction circuit comprising:
 a storage unit for storing a signal level of the transmission signal at a first timing of the clock signal, and outputting the signal level;
 a first detector for detecting the signal level of the transmission signal at a second timing subsequent to the first timing of the clock signal, detecting a first signal level difference between the detected signal level and the signal level from the storage unit, generating a first detection signal representing the detected first signal level difference, and outputting the first detection signal; and
 a delay device for delaying the transmission signal so as to keep a rise time of the transmission signal substantially within a predetermined value range by adding a capacitance corresponding to the first signal level difference to the transmission line based on the first detection signal.

2. The signal correction circuit as claimed in claim 1, further comprising a second detector for detecting a second signal level difference between the first signal level difference and a maximum value of signal level differences between respective adjacent timings of the transmission signal based on the first detection signal, generating a second detection signal representing the detected second signal level difference, and outputting the second detection signal, and wherein the delay device delays the transmission signal so as to keep the rise time of the transmission signal within the predetermined value range by adding the capacitance corresponding to the second signal level difference to the transmission line based on the second detection signal.

3. A signal correction apparatus for use in a signal transmitter apparatus that transmits a plurality of transmission signals generated in accordance with a clock signal having a predetermined cycle via a plurality of transmission lines, the signal correction apparatus comprising:

a plurality of signal correction circuits provided for the plurality of transmission signals, respectively: and
a maximum value detector,
wherein each of the signal correction circuits comprises:
a storage unit for storing a signal level of the transmission signal at a first timing of the clock signal, and outputting the signal level:
a first detector for detecting the signal level of the transmission signal at a second timing subsequent to the first timing of the clock signal, detecting a first signal level difference between the detected signal level and the signal level from the storage unit, generating a first detection signal representing the detected first signal level difference, and outputting the first detection signal;
a delay device for delaying the transmission signal so as to keep a rise time of the transmission signal substantially within a predetermined value range by adding a capacitance corresponding to the first signal level difference to the transmission line based on the first detection signal;
a second detector for detecting a second signal level difference between the first signal level difference and a maximum value of signal level differences between respective adjacent timings of the transmission signal based on the first detection signals, generating a second detection signal representing the detected second signal level difference, and outputting the second detection signal,
wherein the delay device delays the transmission signal so as to keep the rise time of the transmission signal within the predetermined value range by adding the capacitance corresponding to the second signal level difference to the transmission line based on the second detection signal,
wherein each of the signal correction circuits outputs the first detection signal from each of the first detector, and
wherein the maximum value detector detects a maximum value of a plurality of first signal level differences based on the first detection signals from the first detector of each of the signal correction circuits, and outputting the maximum value as a maximum value of the signal level differences between respective adjacent timings of the transmission signals to the second detector of each of the signal correction circuits.

4. A signal transmitter apparatus for transmitting a transmission signal generated in accordance with a clock signal having a predetermined cycle via a transmission line, the signal transmitter apparatus comprising:

a signal correction circuit: and
a signal generator for generating a transmission signal, and outputting the transmission signal to the signal correction circuit,
wherein the signal correction circuit comprises:
a storage unit for storing a signal level of the transmission signal at a first timing of the clock signal, and outputting the signal level;
a first detector for detecting the signal level of the transmission signal at a second timing subsequent to the first timing of the clock signal, detecting a first signal level difference between the detected signal level and the signal level from the storage unit, generating a first detection signal representing the detected first signal level difference, and outputting the first detection signal: and
a delay device for delaying the transmission signal so as to keep a rise time of the transmission signal substantially within a predetermined value range by adding a capacitance corresponding to the first signal level difference to the transmission line based on the first detection signal.

5. The signal transmitter apparatus as claimed in claim 4, wherein the transmission line is a differential transmission path including one pair of transmission lines, wherein the signal transmitter apparatus further comprises a differential driver for generating one pair of differential signals based on the transmission signal, and outputting the differential signal to the differential transmission path, and
wherein the delay device adds the capacitance to each of the one pair of transmission lines.

6. The signal transmitter apparatus as claimed in claim 4, wherein each of the signal correction circuit further comprises:

a second detector for detecting a second signal level difference between the first signal level difference and a maximum value of signal level differences between respective adjacent timings of the transmission is al based on the first detection signal, generating a second detection signal representing the detected second signal level difference, and outputting the second detection signal, and
wherein the delay device delays the transmission signal so as to keep the rise time of the transmission signal within the predetermined value range by adding the capacitance corresponding to the second signal level difference to the transmission line based on the second detection signal.

7. A signal transmitter apparatus for use in a signal transmitter apparatus that transmits a plurality of transmission signals generated in accordance with a clock signal having a predetermined cycle via a plurality of transmission lines, the signal transmitter apparatus comprising:

a signal correction apparatus; and
a signal generator for generating the plurality of transmission signals, and outputting the transmission signals to the signal correction apparatus,
wherein the signal correction apparatus comprises:
a plurality of signal correction circuits provided for the plurality of transmission signals, respectively; and
a maximum value detector,
wherein each of the signal correction circuits comprises:
a storage unit for storing a signal level of the transmission signal at a first timing of the clock signal, and outputting the signal level;
a first detector for detecting the signal level of the transmission signal at a second timing subsequent to the first timing of the clock signal, detecting a first signal level difference between the detected signal level and the signal level from the storage unit, generating a first detection signal representing the detected first signal level difference, and outputting the first detection signal;

a delay device for delaying the transmission signal so as to keep a rise time of the transmission signal substantially within a predetermined value range by adding a capacitance corresponding to the first signal level difference to the transmission line based on the first detection signal;

a second detector for detecting a second signal level difference between the first signal level difference and a maximum value of signal level differences between respective adjacent timings of the transmission signal based on the first detection signal, generating a second detection signal representing the detected second signal level difference, and outputting the second detection signal, wherein the delay device delays the transmission signal so as to keep the rise time of the transmission signal within the predetermined value range by adding the capacitance corresponding to the second signal level difference to the transmission line based on the second detection signal, wherein each of the signal correction circuits outputs the first detection signal from each of the first detector, and wherein the maximum value detector detects a maximum value of a plurality of first signal level differences based on the first detection signals from the first detector of each of the signal correction circuits, and outputting the maximum value as a maximum value of the signal level differences between respective adjacent timings of the transmission signals to the second detector of each of the signal correction circuits.

8. The signal transmitter apparatus as claimed in claim 7, wherein the transmission lines are differential transmission paths that are each including one pair of transmission lines, wherein the signal transmitter apparatus further comprises a plurality of differential drivers for generating one pair of differential signals based on each of the transmission signals, and outputting the differential signals to the respective differential transmission paths, and wherein the delay device adds the capacitance to each of the one pair of transmission lines.

9. The signal transmitter apparatus as claimed in claim 8, wherein the storage unit stores a signal level of either one of the one pair of differential signals as a signal level of the transmission signal, and wherein the first detector detects the signal level of either one of the one pair of differential signals as the signal level of the transmission signal.

10. The signal transmitter apparatus as claimed in claim 9, wherein each of the transmission lines performs transmission by multiplexing a signal on a positive side of the one pair of differential signals with a signal on a negative side of the one pair of differential signals, which are generated based on a further different transmission signal.

\* \* \* \* \*